Feb. 22, 1955

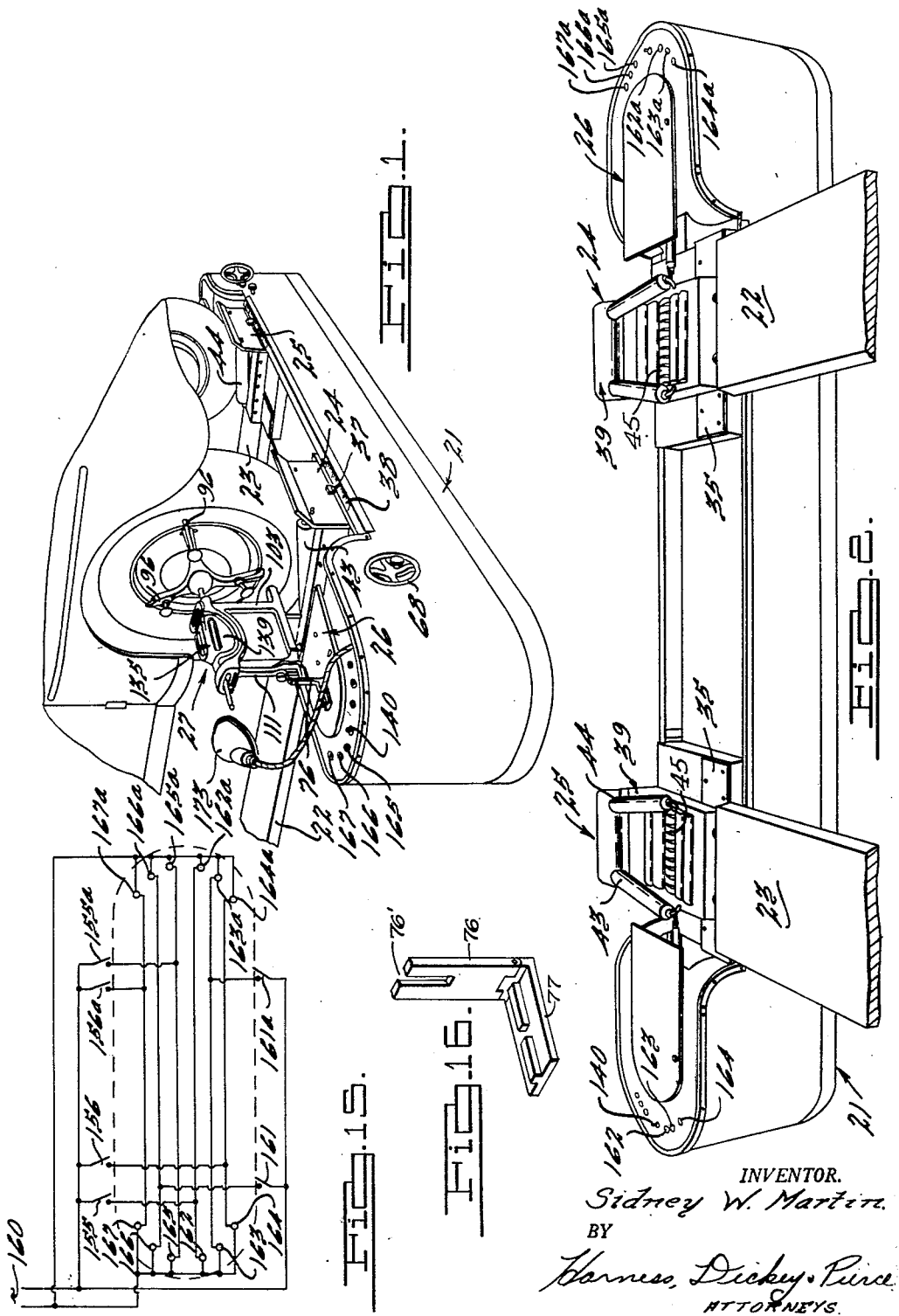

S. W. MARTIN 2,702,432

CHECKING AND ALIGNING APPARATUS FOR
VEHICLE WHEELS, FRAMES, ETC

Filed June 30, 1950

INVENTOR.
Sidney W. Martin.
BY
Harness, Dickey & Pierce.
ATTORNEYS.

Feb. 22, 1955
S. W. MARTIN
2,702,432
CHECKING AND ALIGNING APPARATUS FOR
VEHICLE WHEELS, FRAMES, ETC
Filed June 30, 1950
5 Sheets-Sheet 3
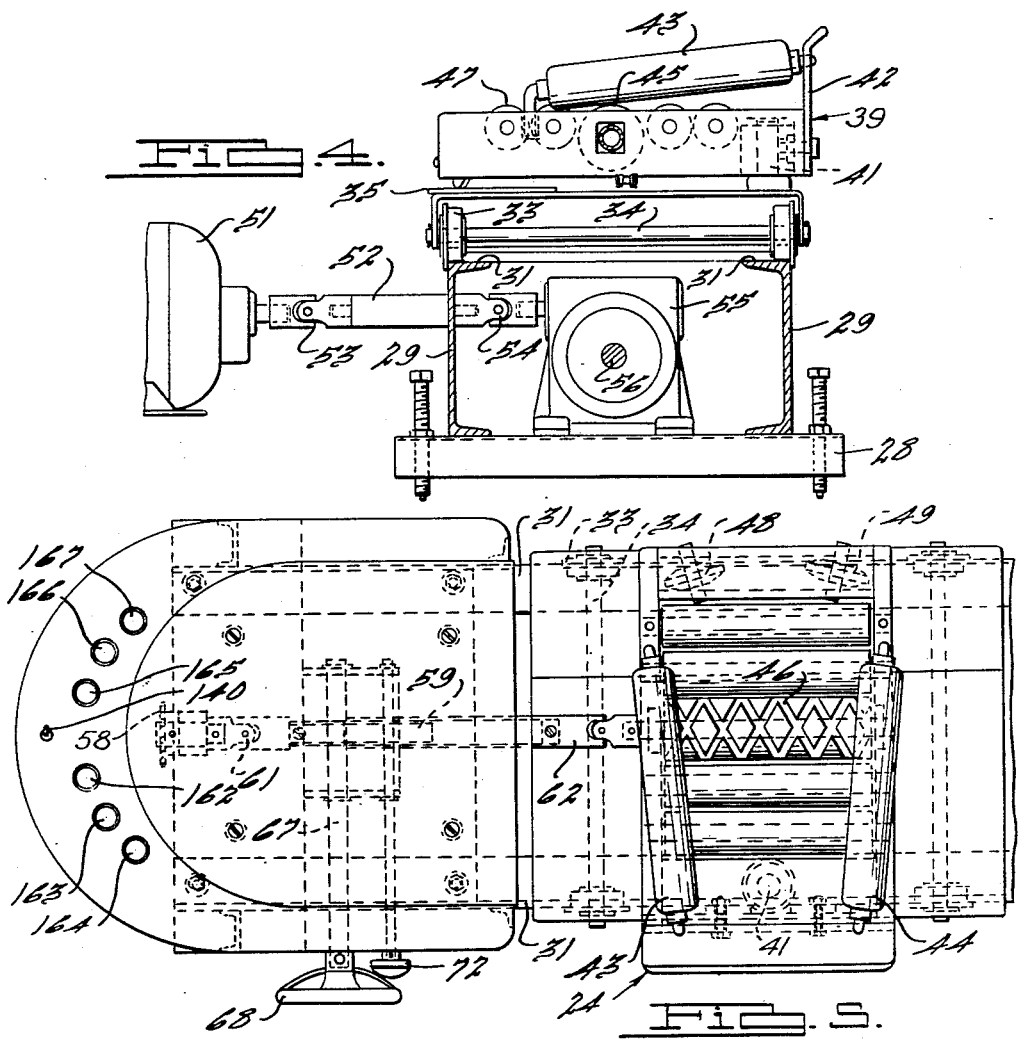
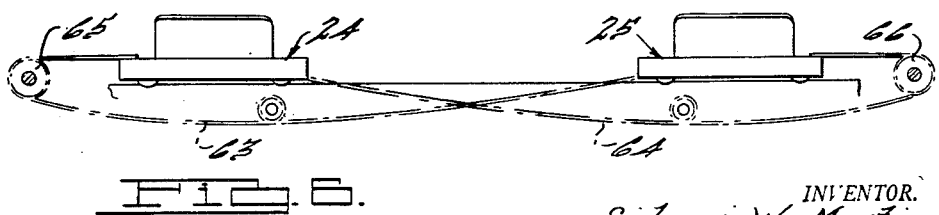
INVENTOR.
Sidney W. Martin.
BY
Harness, Dickey & Pierce.
ATTORNEYS.

Feb. 22, 1955 S. W. MARTIN 2,702,432
CHECKING AND ALIGNING APPARATUS FOR
VEHICLE WHEELS, FRAMES, ETC
Filed June 30, 1950 5 Sheets-Sheet 4
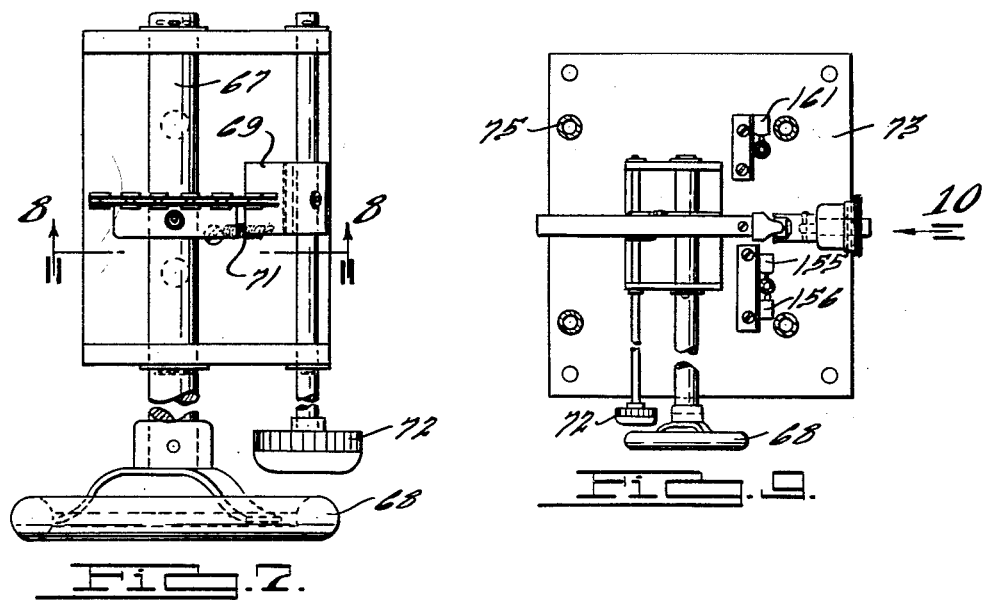
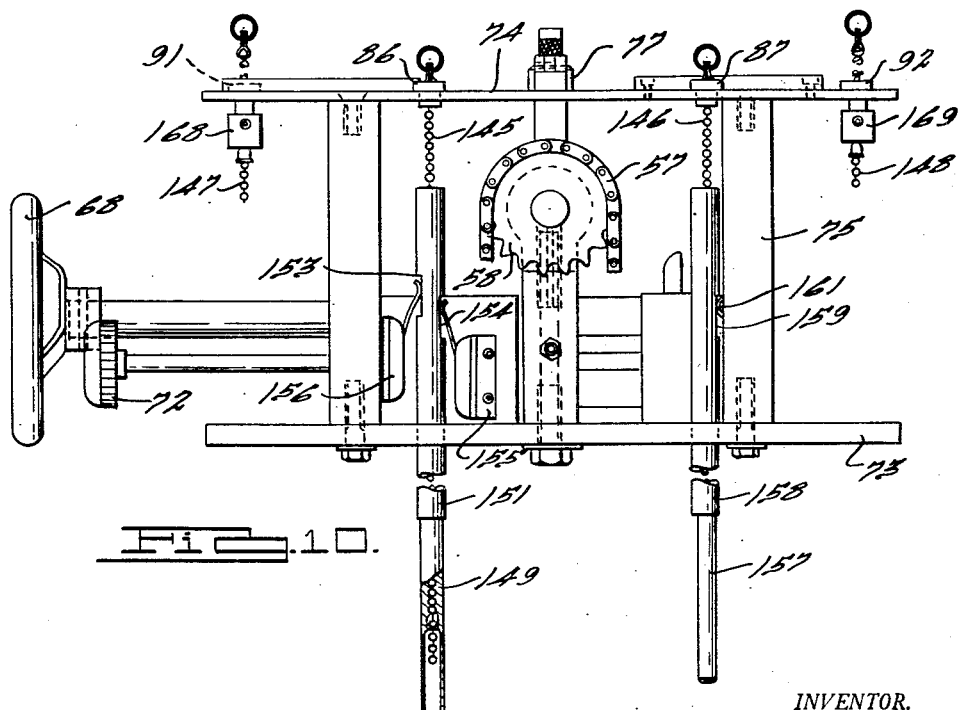
INVENTOR.
Sidney W. Martin.
BY
Harness, Dickey & Pierce
ATTORNEYS

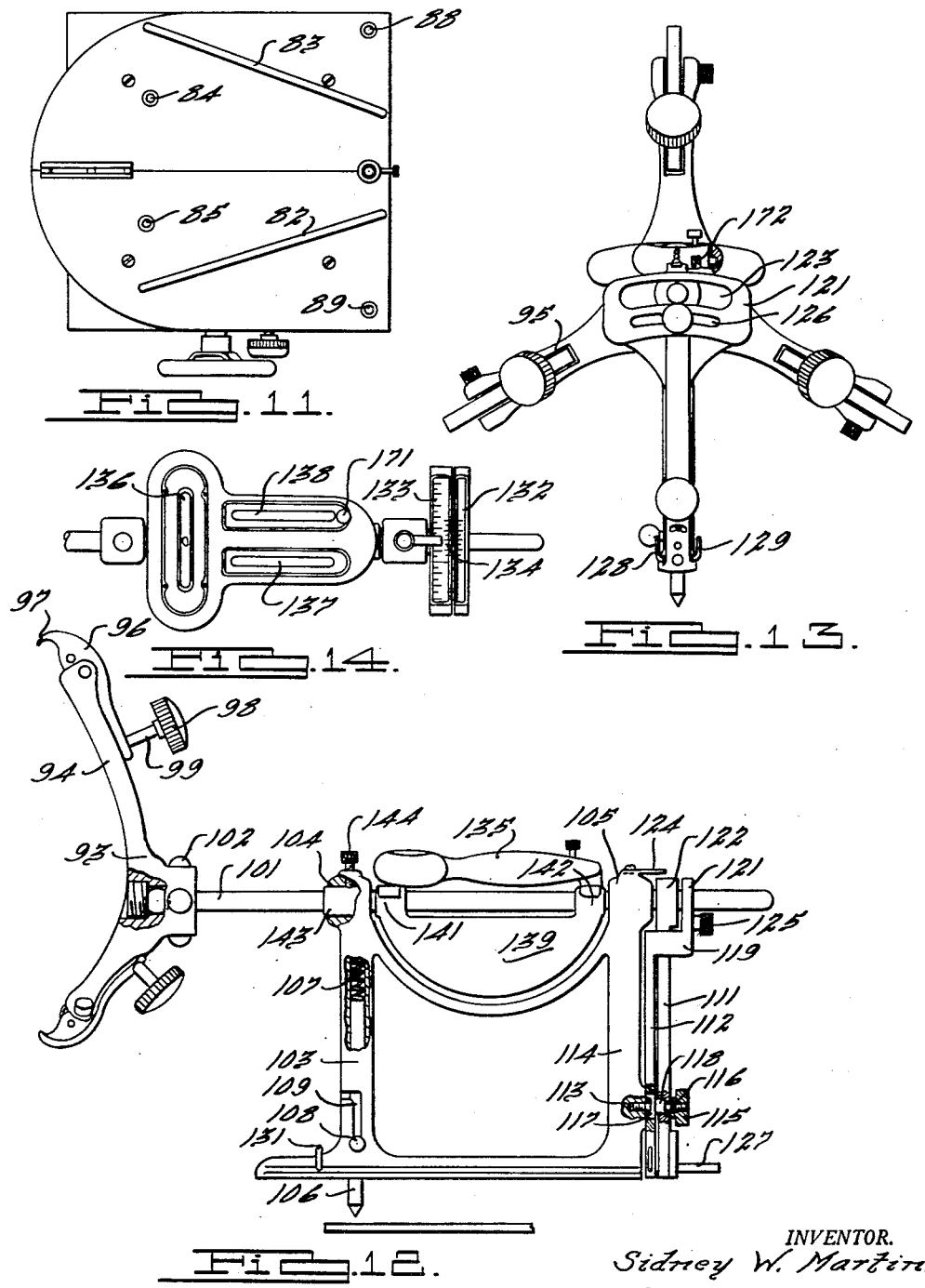

United States Patent Office 2,702,432
Patented Feb. 22, 1955

2,702,432

CHECKING AND ALIGNING APPARATUS FOR VEHICLE WHEELS, FRAMES, ETC.

Sidney W. Martin, Chicago, Ill., assignor to Bear Manufacturing Company, Rock Island, Ill., a corporation of Delaware Application June 30, 1950, Serial No. 171,347

7 Claims. (Cl. 33—203.13)

This invention relates to checking and aligning devices for automotive vehicles, and more particularly to devices for checking the alignment and steering geometry of the front end and steering gear portions of such vehicles.

Some conventional devices of this character have, in the past, used the method of jacking up the front end of the vehicle in order to check the alignment characteristics of vehicles. This method has had the disadvantage, especially in vehicles using independent front end suspension, that the alignment characteristics are substantially altered when the load is removed from the wheels, thus impairing the accuracy of the measurements taken. In other conventional devices of this nature, anti-friction plates have been used under the front wheels to facilitate the turning thereof while the load is still applied, and such devices have also used the method of rolling the vehicle in order to rotate the front wheels 180° to complete the alignment readings. Such methods and devices have the disadvantage of shifting the applied load to different portions of the wheels as they are rotated, thus preventing accurate readings under truly simulated road conditions.

It is, therefore, an object of the present invention to provide an improved checking and aligning device for determining the camber and toe-in readings of automotive vehicles under accurately similated road conditions, with the full working load applied to the front end, and with the wheels rotating while the readings are taken to determine the true running plane of the wheels.

It is another object to provide, in combination with a checking device as described above, improved means for checking the caster, kingpin inclination and turning radius of a vehicle integral with the camber and toe-in checking means, and wherein only a single attaching operation is necessary in order to take a full set of readings on each wheel.

It is also within my contemplation to provide a checking and aligning device as described in which the operative rotation of the wheels is accomplished by power means independent of the vehicle, and in which the wheels are swingable by the steering wheel while still engaged by said power means, in order to determine the alignment characteristics.

It is a further object of this invention to provide a checking device for measuring the turning radius of the front wheels by illuminated indicating means, and in which the turning radii of opposite wheels may be immediately compared by illuminated indicators which are adjacent each other on one side of the checking device.

It is still another object to provide a checking and aligning device, as described, which is adaptable for different track sizes and wheel bases, and in which the track size adjustment may be quickly and easily accomplished.

Other objects of the invention will be apparent from the following specification, the drawings relating thereto, and from the claims hereinafter set forth.

In the drawings in which like numerals are used to designate like parts, in the several views throughout:

Figure 1 is a perspective view of the alignment analyzer with a car shown in operative position thereon;

Fig. 2 is a perspective view from the rear, with the indicator head assembly removed, and with a portion of the tracks broken away for clarity;

Fig. 4 is a cross-sectional view, taken along the line 4—4 of Fig. 3;

Fig. 5 is a plan view of the top of the right side of the analyzer with the indicator head assembly removed;

Fig. 6 is a view showing schematically the arrangement of the track adjustment assembly;

Fig. 7 is a plan view of the right track adjustment sprocket assembly;

Fig. 9 is a plan view of the left-turning radius base plate and associated mechanism;

Fig. 10 is an end elevational view of the left turning radius plate assembly;

Fig. 11 is a plan view of the right turning radius plate;

Fig. 12 is a side elevational view of an indicator head assembly;

Fig. 13 is an end elevational view thereof;

Fig. 14 is a top plan view thereof; and

Fig. 15 is a wiring diagram of the turning radius indicators;

Fig. 16 is a perspective view of the bracket for anchoring the toe scale arm.

Figure 3:
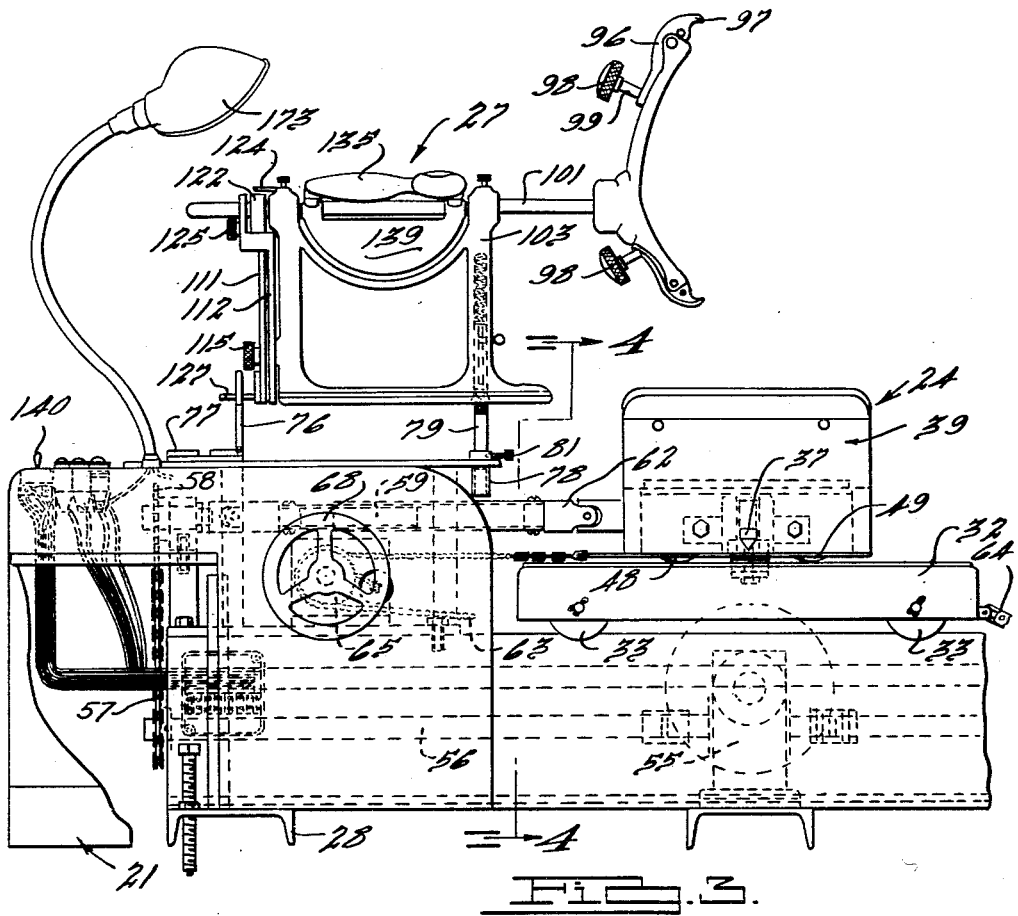
Fig. 3 is a front elevational view of the right side of the alignment analyzer, with parts broken away for clarity.

The wheel alignment analyzer comprises, in general, an elongated housing 21 which encloses and supports the operating portions of the device, inclined tracks or runways 22 and 23 upon which the vehicle may be driven when mounting the analyzer and which extend rearwardly from housing 21, and a pair of roller frame assemblies 24 and 25 which operatively support the front wheels of the vehicle while their alignment is being checked. Since the mechanisms for measuring the left and right wheels are substantially identical, only one side of the analyzing device will be described in detail. Outwardly of each roller frame assembly, and supported by housing 21, are turning radius plate assemblies 26, and supported above each of said assemblies is an indicator head assembly 27 which comprises the spirit level gauges and scales necessary for the checking operation. These various assemblies are supported by a frame which, as shown in Figs. 3 to 5, comprises a plurality of lower supporting channels 28 and front and rear cross channels 29 resting thereon, the frame being substantially enclosed by housing 21.

The top surfaces of the cross channels support the roller frame assembly 24, these surfaces comprising tracks or runways 31 upon which the roller frame assemblies may move transversely of the longitudinal axis of the vehicle. The portion of the roller frame assemblies which rests upon these tracks is the swing platform 32. This platform moves upon four flanged wheels or rollers 33, the rollers being supported by axles 34. The top rear surface of the swing platform 32 has a bearing plate 35 which supports the wheels of the roller frame, to be hereinafter described.

Pivotally mounted upon the swing platform is a roller frame 39. The front vertical wall 42 of the roller frame supports a pointer 37 which cooperates with a tracking gauge 38 on the housing 21 for adjusting the roller frame assembly to the proper track width of the vehicle. The upper portion of the front vertical wall 42 of the roller frame 39 serves as a blocking plate for the wheel of a vehicle carried upon the roller frame and also serves to support the forward ends of wheel guiding rollers 43 and 44, the rear ends of these guiding rollers being supported by the side edges of the roller frame. Extending transversely across the roller frame is a wheel driving drum 45 which, as will be later described in detail, serves to rotate the front wheel while certain of the alignment readings are being taken. This driving drum preferably has on its surface frictional portions 46 for engaging the tire tread while it is being driven. Forwardly and rearwardly of driving drum 45 are mounted idler rollers 47. It will be seen, therefore, that when the front wheel is centrally supported upon roller frame 39, the wheel may be rotated when driving torque is applied to drum 45. The rear end of the roller frame is supported by wheels 48 and 49 rotatably mounted thereunder, and which rest upon bearing plate 35. The extended axes of these wheels pass through pivot 41 so that, upon operative movement, the roller frame may be swung about this pivot.

The means for independently driving the driving drum 45, as best seen in Figs. 3, 5 and 10, comprises a motor 51 mounted rearwardly of the housing which rotates a drive shaft 52 having universal joints 53 and 54. Mounted within the housing is a reduction gear 55 which transmits this rotary power by means of shaft 56 and chain 57 to sprocket 58 connected to extensible shaft 59 through universal joint 61, the driving drum being connected to shaft 59 through universal joint 62. The purposes and functions of the universal joints and extensible shaft will more fully appear hereafter.

Figure 8:
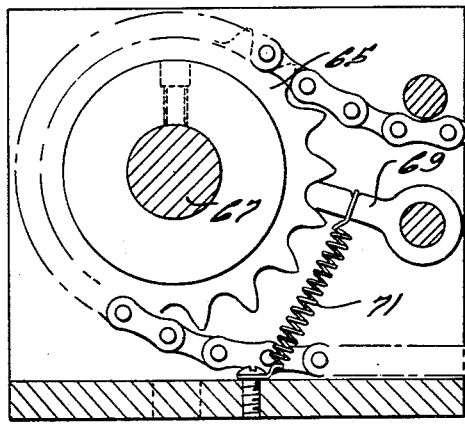
Fig. 8 is a cross-sectional view, taken along the line 8—8 of Fig. 7.

The means for adjusting the roller frame assemblies to the proper track width is best shown in Figs. 6, 7 and 8. As shown schematically in Fig. 6, the roller frame assemblies may be moved simultaneously toward or away from the center of the device by means of chains 63 and 64. Chain 63 is attached at one end to the left side of the left roller frame assembly 24, as viewed in Fig. 6, and extends around a sprocket 65, the other end being attached to the left side of the right roller frame assembly 25. Chain 64 is attached at one end to the right side of assembly 25 extending around sprocket 66 to the right side of assembly 24, as shown in Fig. 6. It will be seen from Fig. 6 that upon counterclockwise rotation of sprocket 65, or clockwise rotation of sprocket 66, the roller frame assemblies will be simultaneously moved away from the center of the device to accommodate a vehicle having a larger track width as indicated on tracking gauge 38. On the other hand, when sprocket 65 is rotated clockwise, or sprocket 66 counterclockwise, the roller frame assemblies will be simultaneously moved toward the center of the device. As seen in Figs. 7 and 8, each sprocket 66 is mounted on a shaft 67 which extends through the housing and supports at its front end a hand wheel 68. A locking dog or pawl 69 is engageable with each sprocket, being urged into such engagement by a spring 71 and movable out of engagement with the sprocket by knob 72. The arrangement is such that in order to move the roller frame assemblies toward the center it is necessary to release the locking pawls, whereas the assemblies may be freely moved away from the center without the necessity of disengaging these pawls.

The turning radius plate assembly for each wheel is disposed outwardly of the roller frame assembly and is rigidly secured to the main frame of the mechanism. As best seen in Figs. 9, 10 and 11, the turning radius plate assembly comprises a turning radius base plate 73 and a turning radius plate 74 spaced upwardly therefrom and secured thereto by means of posts 75. As will be more fully described hereinafter, the turning radius plate serves to operatively support the indicator head assembly when certain of the alignment readings are being taken. For this purpose the upper surface of the turning radius plate is provided with a toe bracket 76 having a slot 76' therein, the toe bracket being pivoted at one end to a base 77, whereby the bracket may be swung into vertical position as shown in Fig. 3 or folded into retracted horizontal position against base 77. Adjacent the inner edge of the turning radius plate is a bushing 78 having therein a vertically adjustable cylindrical member 79 which serves as a seat for a toe bolt on the indicator head assembly described below. A lock screw 81 is used to firmly hold the toe bolt seat 79 in its vertical adjusted position. The upper surface of the turning radius plate is also preferably provided with a pair of turning radius guides 82 and 83 in the form of elongated metal strips. These guides are positioned on radial lines extending from the turning center of the wheel and may be used as approximate indications of the turning angles. Each turning radius plate is further provided with four apertured portions which, as best shown in Figs. 10 and 11, accommodate four beaded chains which are used in taking the readings. The chain apertures 84 and 85 are provided with bushings 86 and 87 and the chain apertures 88 and 89 have bushings 91 and 92. The specific arrangement of the chains which pass through these apertures and the mechanism controlled thereby will be later described in relation to the indicator head assembly with which they cooperate.

The indicator head assembly, best shown in Figs. 12, 13 and 14, comprises a spindle bracket 93 having three equidistant radially extending curved arms 94. The outer end of each of these arms has a slot 95 and a claw 96 pivoted to the arm and disposed partially within the slot, the outer end 97 of the claw being hooked in such a manner as to be engageable with the rim of the wheel. The inner end of the claw is provided with a knob 98 threadably engaged therewith by knob shaft 99, the inner end of the threaded knob shaft being engageable with the arm 94 in such manner that when the shaft is threaded into the claw, the inner end thereof will be lifted away from the arm and the outer end 97 engaged with the rim. The hub of the spindle bracket has an alignment spindle 101 extending outwardly therefrom. This spindle is held firmly in place by three spindle adjustment screws 102 which may be used to selectively adjust the axis of rotation of the spindle.

Rotatably mounted on the alignment spindle is a pointer frame 103 which depends below the spindle and is supported thereon by spaced bearings 104 and 105. The inner portion of the pointer frame is provided with a toe bolt 106 extending downwardly therefrom and urged into its downward position by a compression coil spring 107 disposed within the pointer frame. A handle 108 is attached to the toe bolt and extends through a bayonet slot 109 so that the toe bolt may be lifted and held in an upper or retracted position. The outer end of the pointer frame has pivoted thereon a toe gauge scale arm 111 and independently thereof a track scale arm 112. These arms are pivoted on a common pivot which comprises a pivot pin 113 threaded into a boss 114 on the outer end of the pointer frame. The outer end of pin 113 is provided with a locking knob 115 and a spring 116 so that upon proper adjustment arms 111 and 112 will be yieldably held in position relative to the pointer frame. A bushing 117 is positioned in arm 112 surrounding the pivot pin and has a sleeve 118 extending outwardly therefrom upon which arm 111 is pivoted. Arm 112 is positioned inwardly of arm 111 at the pivot point but has a horizontal intermediate portion 119 which extends outwardly of arm 111 and is slotted to allow arm 111 to pass therethrough. The upper portion 121 of arm 112 is positioned outwardly of the upper portion 122 of arm 111 and both upper portions are enlarged to accommodate the respective gauge scales. The top surface of portion 121 of the track scale arm is provided with a track scale 132 and the upper surface of portion 122 of the toe gauge scale arm has a toe gauge scale 133 and in addition a wheel base scale 134 adjacent the track scale 132. These upper portions of the scale arms are also provided with arcuate slots 123 (the slot in the upper portion of arm 111 being coincident with the slot in arm 112, as viewed in Fig. 13), so that the alignment spindle 101 may move freely therein. A toe gauge scale pointer 124 is mounted on bearing 105 of the pointer frame and cooperates with the toe gauge scale in a manner to be later described. A track locking knob 125 is preferably mounted in an arcuate slot 126 of track arm 112 and is engageable with toe gauge scale arm 111 so that under certain conditions these two arms may be locked together. The lower end of arm 111 is provided with a toe rod 127 extending outwardly therefrom and engageable by slot 76' of toe bracket 76. Two hooks 128 and 129 are attached to the lower end of arm 112 and are engageable by the two outer bead chains to be hereinafter described. The inner end of the pointer frame has two similar hooks 131 for engaging the inner bead chains.

The upper portion of the pointer frame is concave in shape and accommodates between bearings 104 and 105 a T-shaped gauge level housing 135. As best shown in Fig. 14, the head of the T-shaped housing contains a spirit inclinometer 136 provided with calibrations for indicating king pin inclination and the stem portion of the housing contains a spirit inclinometer 137 having calibrations for indicating camber and an inclinometer 138 having calibrations for indicating caster. These gauges are of conventional design and need not be described in detail. Integral with housing 135 is a pendulous member 139 which depends below the alignment spindle 101 and is supported thereon by two bearings 141 and 142. It will thus be seen that the housing 135 may be held in a plumb position by the pendulous member 139 even when spindle 101 is swung with the wheel. A sleeve 143 extends inwardly from the bearing 141 within pointer frame bearing 104, and a lock screw 144 is mounted in bearing 104 and may be used to lock the gauge level housing to the pointer frame.

In operation, the vehicle is driven onto runways 22 and 23 with the two rear wheels centered on the runways and the two front wheels resting squarely on the roller frames, so that the axis of the analyzing device is normal to the longitudinal axis of the vehicle. The roller frames may be adjusted to the proper track width by means of the track adjusting means hereinbefore described. The alignment spindles 101 are installed by clamping spindle brackets 93 to the wheels, and the indicator head assemblies are slid onto the spindles and attached to the turning radius plates by engaging toe bolt 106 of each pointer frame in its toe bolt seat 79 and lifting toe brackets 76 to engage the toe rods 127 in the slots thereof. To adjust each alignment spindle, the motor 51 is actuated by means of a switch 140 so that the driving drum 46 will slowly rotate the wheel. Toe locking knob 115 is adjusted to eliminate play between arms 111 and 112 and the pointer frame without binding them against movement. Since the alignment spindle 101 will ordinarily not be in true alignment with the axis of rotation of the wheel, rotation of the alignment spindle will cause the toe gauge pointer 124 to move back and forth relative to the toe scale 133. Spindle adjusting screws 102 may be thereupon adjusted until the toe gauge pointer remains relatively stationary on the toe scale. The gauge level housing is locked to the pointer frame by means of lock screw 144, and the camber and toe readings may then be taken by means of camber gauge 137 and toe scale 133, the vehicle wheel being continuously rotated while the readings are taken.

To prepare for the measurement of turning radius, the motor 51 is stopped, and the pointer frame is disengaged from the turning radius plate by retracting the toe bolt 106 and disengaging the toe plate 75 from the toe rod 127. The track scale 132 and the wheelbase scale 134 may be adjusted to bring the number representing the track width of the vehicle opposite the number that represents wheelbase length and the scales are locked in this position by locking screw 125. The outer bead chains 145 and 146 are now engaged to hooks 128 and 129 respectively and the inner bead chains 147 and 148 are engaged to hooks 131. This operation is repeated on the opposite wheel. In view of the fact that movement of the arm 112, that is, movement of the track scale 132 raises or lowers the hooks 128 and 129, such movement changes the terminal positions of the chains 145 and 156 and in effect changes the relative lengths of said chains. This, in effect, changes the respective distances between weights 149 and switches 155 and 156, and weights 157 and switch 161. Hence, for a predetermined angular movement of the automobile wheels the correct correlation of wheel base to track width obtains.

The lower end of forward outer bead chain 145 has a weight 149 which passes freely through a fixed tube 151. This tube has cutaway portions at 153 and 154 which accommodate the toes of switches 155 and 156, these switches being preferably of a small, quick-acting type, such as the well known microswitch. Bead chain 146 has at its lower end a weight 157 freely movable through a fixed tube 158 which has a cutaway portion 159 accommodating the toe of a similar switch 161. Weights 149 and 157 serve as cams for engaging and actuating the toes of the switches. As shown diagrammatically in Fig. 15, these switches are connected by wiring to a current source 160 and to illuminated indicating means or lamps arranged in four arcuate banks of three lamps each, located outwardly of the turning radius plates. Specifically, switch 155 is connected to lamps 162 and 162a in the rear banks of indicators, the arrangement being such that these lamps, which are in parallel, will be illuminated when the left wheel has turned 19 degrees to the left. Switch 156 controls lamps 164 and 164a, closing the circuit to these lamps when the left wheel has turned left 21 degrees. Switch 161 controls lamps 166 and 166a in the front banks of indicators, and is arranged to actuate these lamps when the left wheel turns right 20 degrees. Switches 155a, 156a, and 161a are operated by the right wheel by bead chains and sliding weights (not shown) in a similar manner. Switch 155a will illuminate lamps 165 and 165a when the right wheel has turned right 19 degrees and switch 156a will operate lamps 167 and 167a when the right wheel turns right 21 degrees. When the right wheel is turned left 20 degrees, switch 161a will be actuated, lighting lamps 163 and 163a.

It will be observed that the lamps which indicate turning angles of 20 degrees are arranged in the various banks between the lamps indicating 19 degree and 21 degree turning angles. It will also be noted that the lamps in each bank indicate progressively increasing turning angles at increasing distances from the center line of the machine. The bead chains 147 and 148 have stops 168 and 169 attached to their lower ends and serve to limit the swinging movement of the gauge assemblies in each direction during the readings.

In order to measure turning radius, the steering wheel is first turned left slowly. During this movement, the roller frame 39 will pivot about pivot pin 41 and platform 32 will move on tracks 31, extensible shaft 59 and universal joints 61 and 62 allowing this movement to take place. As the wheel is turned, the entire indicator head assembly, now disconnected from the turning radius plate, will move with the wheel. As weight 149 is drawn upwardly, it will first actuate switch 155 to illuminate lamps 162 and 162a and indicating a 19 degree left wheel turn. If the wheels are properly aligned, further turning of the steering wheel will next close switch 161a, illuminating lamps 163 and 163a to indicate that the right wheel has turned left 20 degrees. Further turning of the wheels will cause weight 149 to move upwardly still further until it actuates switch 156, illuminating the lamps 164 and 164a and indicating that the left wheel has turned left 21 degrees. The steering wheel may next be turned to the right, first actuating switch 155a, illuminating lamps 165 and 165a to indicate that the right wheel has turned right 19 degrees. If the wheels are properly aligned, switch 161 will next be actuated, illuminating lamps 166 and 166a to indicate a 20 degree left wheel turn. Finally, switch 156a will be closed, showing that the right wheel has turned 21 degrees. If the lamps are not illuminated in the indicated sequence, the operator is apprised that their angular relationship is incorrect during steering movement, and the order in which they are illuminated will show the nature of any such misalignment.

Caster and kingpin inclination may be measured at the same time as the turning radius. To measure caster and kingpin inclination on the right wheel, the brake pedal is held in a depressed condition and the wheels may be turned left until lamps 162 and 163 are illuminated. The bubbles on the caster and kingpin gauges of the right wheel are then set and locked in their zero position by means of caster level adjustment screw 171 and kingpin lock screw 172. The wheels are then turned right until lamps 165 and 166 are illuminated, and the caster and kingpin inclination readings taken on the right wheel. The left wheel readings may be similarly taken by setting the gauges in their zero position when the wheels are swung to the right and then turning the wheels left to obtain the readings.

A lamp 173 may be provided at each end of the machine in order to aid in taking readings on the various spirit level gauges.

What is claimed is:

1. In a vehicle wheel alignment analyzing device, a support for the wheel allowing rotation thereof while the vehicle load is applied, driving means engageable with the wheel to rotate the same on said support, a spindle extending outwardly substantially normal to the plane of rotation of the wheel and rotatable therewith, a frame rotatably mounted on said spindle and depending therebelow, an arm pivotally attached to said frame, a bracket engageable with one end of said arm to prevent horizontal movement thereof, and cooperating indicating means on said frame and said arm, whereby eccentric rotation of said spindle will cause relative movement of said indicating means.

2. In a vehicle wheel analyzing device, a pair of parallel tracks extending transversely of the vehicle, a wheeled platform mounted on said tracks, a roller frame pivotally mounted on said platform, a driving drum rotatably mounted on said roller frame for rotating the vehicle wheel, an idler roller rotatably mounted on said roller frame on either side of said driving drum, a wheel stop plate secured to the forward end of said roller frame, and a pair of wheel guide rollers extending along the sides of said roller frame, the forward ends of said guide rollers being supported by said stop plate.

3. In a vehicle wheel alignment analyzing device, a support for the wheel allowing rotation thereof while the vehicle load is applied, a spindle extending outwardly substantially normal to the plane of rotation of the wheel and rotatable therewith, a pointer frame rotatably mounted on said spindle and depending therebelow, a plate fixedly mounted below said pointer frame, a seat mounted on said plate and engageable with the base of said pointer frame to prevent horizontal movement thereof, a toe scale arm pivotally mounted on said pointer frame and having a calibrated toe scale on its upper end, a bracket mounted on said plate and engageable with the lower end of said toe scale arm to prevent horizontal movement thereof, and a pointer mounted on said pointer frame and cooperating with said toe scale to indicate the toe angle of said wheel.

4. In a vehicle wheel alignment analyzing device, the combination according to claim 3, said toe scale arm being further provided with a calibrated wheelbase scale, a track scale arm pivotally mounted on said pointer frame adjacent said toe scale arm, and a calibrated track scale on the upper end of said track scale arm and adjacent said wheelbase scale.

5. In a vehicle wheel alignment analyzing device, the combination according to claim 3, said pointer frame being provided with a retractable toe bolt engageable with said seat, said toe scale arm being further provided with a toe rod engageable with a slotted portion of said toe bracket.

6. In a vehicle wheel analyzing device, a pair of parallel tracks extending transversely of the vehicle, a pair of roller frame assemblies mounted on said tracks for rotatably supporting the front wheels of the vehicle, and adjusting means for simultaneously moving said assemblies toward and away from the center of the tracks, said adjusting means comprising a tension element connecting the left sides of said assemblies, and a second tension element connecting the right side of said assemblies and actuating means for exerting tension on one of said elements in either direction, said actuating means comprising a sprocket engageable with an intermediate portion of one of said elements, means for manually rotating said sprocket and a locking pawl engageable with said sprocket for preventing rotation thereof in one direction.

7. In a vehicle wheel alignment analyzing device, a support for the wheel allowing rotation thereof while the vehicle load is applied, driving means engageable with the wheel to rotate the same on said support, a spindle extending outwardly substantially normal to the plane of rotation of the wheel and rotatable therewith, a gauge for indicating an alignment characteristic of the wheel comprising a frame, an arm pivotally carried on said frame and relatively movable thereto, said gauge being rotatably mounted on said spindle and being laterally movable therewith, and restraining means positioned adjacent said gauge for preventing one point on said arm from moving laterally whereby said arm and said frame pivot relative to each other to indicate the alignment characteristics of said wheel while it is rotating.

References Cited in the file of this patent

UNITED STATES PATENTS

| | | |
|---|---|---|
| 1,796,979 | Bells | Mar. 17, 1931 |
| 1,804,490 | Bagge | May 12, 1931 |
| 1,959,642 | Phelps | May 22, 1934 |
| 2,036,653 | Starr | Apr. 7, 1936 |
| 2,137,949 | Phelps | Nov. 22, 1938 |
| 2,160,145 | Holmes | May 30, 1939 |
| 2,167,361 | Haucke | July 25, 1939 |
| 2,171,616 | Wilkerson | Sept. 5, 1939 |
| 2,250,742 | Bennett | July 29, 1941 |
| 2,270,230 | Pearce | Jan. 20, 1942 |
| 2,285,965 | Halstead | June 9, 1942 |
| 2,438,358 | Castiglia | Mar. 23, 1948 |
| 2,463,377 | Grant | Mar. 1, 1949 |
| 2,581,021 | Jacobson et al. | Jan. 1, 1952 |
| 2,582,427 | Greenleaf | Jan. 15, 1952 |

FOREIGN PATENTS

| | | |
|---|---|---|
| 62,978 | Germany | July 1, 1892 |